United States Patent Office 3,786,049
Patented Jan. 15, 1974

3,786,049
PROCESS FOR THE PREPARATION OF N-ACYL-
ATED DERIVATIVES OF 6-AMINO PENICIL-
LANIC ACID
Antonio Luis Palomo-Coll, Maestro Perez Cabrero 7,
Barcelona, Spain
No Drawing. Filed Dec. 22, 1969, Ser. No. 887,338
Claims priority, application Spain, Dec. 21, 1968,
361,743; May 12, 1969, 367,136; July 26, 1969,
369,916
Int. Cl. C07d 99/16
U.S. Cl. 260—239.1
11 Claims

ABSTRACT OF THE DISCLOSURE

A process for the preparation of amides, hydrazides and esters and of alpha-aminobenzylpenicillin and N-substituted derivatives, consisting of the prior preparation of a dimethylformiminium halosulfite N-halide by adding a solution of dimethylformamide, at room temperature, to a solution of a thionyl halide in an organic solvent, then adding a carboxylic compound and then an amine, a hydrazine or an alcohol to obtain the above-mentioned derived compounds.

---

The present invention relates to a new process for obtaining carboxylic acid amides, hydrazides and esters, the functional groups of which are used as ingredients in numerous compounds with application in the chemical, chemico-pharmaceutical and veterinary industries, some of which are described in the present specification for the purpose of example.

Technical literature contains extensive descriptions of the conventional methods for obtaining amides, hydrazides and esters, starting out from ammonia, amines, hydrazines and alcohols, which are combined with an agent, such as an acid anhydride or chloride, the acyl radical of which is incorporated in the derivative which it is desired to obtain. These acid anhydrides and chlorides, as in the case of using esters for the preparation of amides, are, of necessity, previously obtained from the carboxylic acids and their direct use has been possible in exceptional cases, requiring high temperatures and suitable catalysts, nevertheless their use is normal in esterification processes which are not always practicable and depend on the nature of the acid and of the group to be transformed.

The process covered by the present invention is characterized by the fact that it uses acids or their inorganic salts or their tertiary amine organic salts, it operates at room or lower temperatures and allows for the preparation, in short periods of time, of derivatives which are hard to obtain or give a poor yield when obtained by usual treatments, requiring unsuitable treatments which complicate or raise the cost of their technology. With reference to the simplicity of processes which tend to activate the carboxyl group, one should mention those related to the synthesis of peptides (L. Velluz, Substances Naturelles de Synthèse, Masson et Cie, Paris, 1954, pp. 90–94), a field of action where the new method being described is of special interest.

It is well known that the dimethylformamide-thionyl chloride reagent (DMF-Cl$_2$SO) has recently been put to some interesting applications (Fieser and Fieser, Reagents for Organic Synthesis, John Wiley and Sons, Inc., New York, 1967, p. 286) and Bosshard et al. (Helv. Chim. Acta, 42, 1655, 1656 and 1663 (1959)) established the hypothesis of the constitution of the above complex to explain the formation of dimethylforminiminium chloride, a product isolated from the combination between dimethylformamide and the thionyl chloride, thereby justifying the catalytic action of DMF in the formation of acid chlorides and presuming a certain reactive capacity for the DMF-Cl$_2$SO complex. Following the same line of thought, it has recently been found that the presence of a primary amide is favorable for the preparation of acid chlorides, by heating the organic acids with thionyl chloride under reflux. (Brit. No. 942,621 (1963), Bayer A.G., CA: 60–10607 (1964).)

The present invention is based on the fact that for the first time it has been possible to isolate the compound resulting from the DMF-Cl$_2$SO reaction and establish its structure, corresponding to dimethylforminiminium chlorosulfite chloride (I),

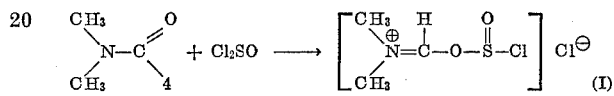

isolated in the form of an oil on mixing dimethylformamide and thionyl chloride solutions in benzene; it being also obtained in a solid, white, crystalline state, the infrared spectrum of which, measured amongst sodium chloride crystals in a Perkin-Elmer model 457 spectrophotometer, showed an intense band at 5.93µ due to the

group, with a value of 16.41% for the sulfur content (calculated value: 16.69%). This compound, insoluble in non-polar solvents, soluble in polar solvents and very unstable under humid conditions, decomposes under the effect of temperature to produce Bosshard's forminiminium chloride for which it turns out to be the precursor.

Now that it has been discovered that the primary component of the DMF-Cl$_2$SO reaction is dimethylforminiminium chlorosulfite N-chloride, stable when protected from ambient humidity at temperatures below 25° C., it has been possible to develop a simple process for the preparation of amides, hydrazides and esters of carboxylic acids, characterized by the following sequence.

(1) At temperatures between —10 and 25°, controlled by chilling dimethylforminiminium chlorosulfite chloride is reacted with an acid, or its inorganic or tertiary amine salts, to form the intermediate Compound II, with the nature of a mixed, highly reactive anhydride

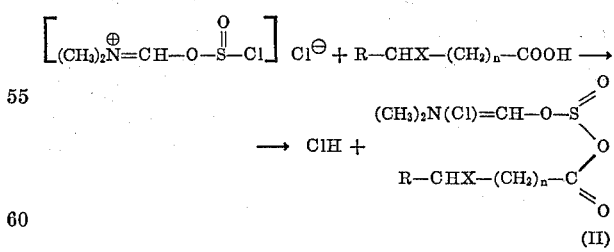

in which R may be an aliphatic, alicyclic, aromatic, alkano-aromatic or heterocyclic group with or without substituents, $n$ may vary from 0 to 20 and X indicates hydrogen, chlorine, phenyl, alkoxy, phenoxy, hydroxy, azide, nitrile or other substituents normal in organic compounds.

(2) Indiscriminately, there is added to the product of the above reaction a compound with a functional amine, hydrazine or alcohol group; or it is poured over an aqueous solution of ammonia, hydrazine or compound with the desired function in an inert medium, to obtain the corresponding derivative according to the following representative equation:

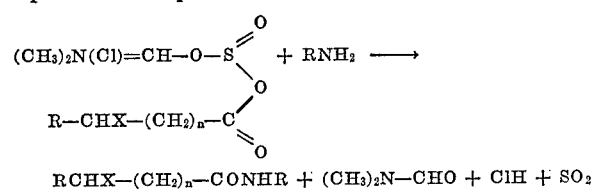

$$RCHX—(CH_2)_n—CONHR + (CH_3)_2N—CHO + ClH + SO_2$$

wherein R, n and X are as hereinbefore defined; esters are then obtained by chilling whilst tertiary organic bases or inorganic bases are used to neutralize the liberated hydrochloric acid, when this is necessary, since it is not necessary in the case of alcohol; then the known methods are used to isolate the resulting product, it being sufficient in the majority of cases to dilute the reaction mass in water and filter it. Simple distillation or extraction with a suitable solvent are also usual, practicable processes.

The mixed anhydride II, in view of its special electron structure, may undergo partial or total transformation into the acid chloride, favored by the structure of the acid and the temperature; normally the dimethylformiminium chlorsulfite chloride quickly gives rise to Compound II and thus it turns out to be an important reagent for obtaining amides, hydrazides and esters, thereby forming the basis of a new process of industrial and technological interest because of its simplicity, speed, economy and general application of the method, which is very easy to understand, even in the case of acids which rapidly become chlorides since, as is well known, these also form derivatives in moderate operative conditions.

Among the large number of acids and salts tested, some representative samples are worthy of note, such as obtaining a gaseous current of trifluoroacetyl chloride with a quantitative yield when trifluoracetic acid is allowed to fall drop by drop on the dimethylformiminium chlorosulfite N-chloride at 5°. The gas, absorbed in a solution of benzene or other suitable solvent containing an amine, hydrazine or alcohol, produces the respective derivative; the trifluoracetyl radical has proved to be of interest as a protective group for the amine function (S. Patai, The Chemistry of the Amino Group, Interscience Publishers, New York, 1968, p. 672). With the mono-, di- and trichloroacetyl acids, the anhydride (II) which results as an immiscible phase in benzene, rapidly combines with the alpha-amino-p-nitrophenacyl tosylate to form alpha-halogenoacetamide derivatives in a few minutes with an almost quantitative yield; these products were previously prepared by Gut et al. (Collection Czech. Chem. Communes, 15, 508 (1950)) by heating the acid chloride in benzene for 8 to 12 hours under reflux with a 70–85% yield. The alpha-dichloroacetamide-p-nitrophenacyl is of interest in the synthesis of the antibiotic chloramphenicol.

Surprising results are obtained in the preparation of alpha-chloro-phenylacetic acid derivatives with the reagent and mandelic acid. These derivatives are obtained in a short time, through one single operation, with yields of around 94–98%, whilst the best process described (E. L. Eliel, M. T. Fisk and T. Prosser, Org. Synth., vol. 36, 3 (1956)) requires a five stage process. Likewise, alpha-chlorodiphenylacetate is obtained with alpha-hydroxydiphenylacetic acid and diethylamine ethanol. This product is an antihistaminic obtained previously by R. R. Buttner and J. W. Cusic (J. Am. Chem. Soc., 65, 262 (1943)) through a much more complex process. It has been extraordinarily simple to obtain the interesting diuretic, 4-chloro-N-methyl-3-(methyl-sulfamyl) benzamide, simply by using 4-chloro-3-chlorosulfamyl benzoic acid and an aqueous solution of mono-methylamine, in comparison with the process described in the German Pat. No. 1,158,957 (CA: 60–10608a, 1964).

In peptic synthesis, the preparation of alpha-azidobenzylpenicillin is achieved simply by adding the intermediate II, resulting from the combination of the dimethylformiminium chlorosulfite N-chloride and the sodium salt of alpha-azidophenylacetic acid to a suspension of 6-amino-penicillanic acid in chloroform, dichloroethane or other suitable medium. While the azide group is reduced to amine, by way of palladium barium carbonate, in an aqueous medium at normal temperature, the result is alpha-amino-benzylpenicillin. Other penicillins are obtained simply by varying the organic acid; thus, using phenoxyacetic acid, phenoxypenicillin is obtained and the relative penicillin is obtained when 2,6-dimethoxybenzoic acid is used.

In the field of antibiotics, especially in semi-synthesis penicillins and problems related with the integration of structures difficult to obtain by other means, it has been possible to obtain alpha-substituted benzylpenicillins, which products are derived from a process of acylation of 6-aminopenicillanic acid (6-APA), giving rise to the formation of the amide function in the resulting structure. Thus the alpha-carboxy, alpha-methoxy and alpha-fluoro variations are preferably prepared, among others, such as the alpha-phenyl, alpha-methyl, etc. The direct use of substituted phenylacetic acids, such as those described by Mosher et al. (J. Org. Chem., 2797, 1967) is an essential factor of the method, without it being necessary to prepare beforehand the corresponding acid chlorides or mixed anhydrides by the usual methods, which have not always been useful in the acylation processes.

In order to achieve the preparation of alpha-substituted benzylpenicillins directly from acids or their salts, as mentioned above, the chosen acid is combined with the compound of the General Formula I to give rise to a very active intermediate which very probably has the nature of an anhydride, which intermediate is reacted with 6-aminopenicillanic acid to form an alpha substituted benzylpenicillin with the following general formula:

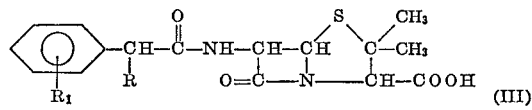

where $R_1$ is hydrogen or any group of the series $NO_2$, $CH_3$, halogen, $NH_2$ occupying any possible position on the aromatic ring and R is a phenyl methyl, methoxy, fluoro or carboxy group.

The outstanding characteristic of the process lies in the special activity of the reagent which does not alter the optical activity of the acids used and enables optically pure alpha-benzylpenicillins of the D and L group to be obtained. Likewise its selectivity is shown by the achievement of the formation of the alpha-carboxy derivative, simply by using stoichiometric amounts of phenylmalonic acid and dimethyl-formiminium chlorosulfite N-chloride.

It has also been possible to discover now that for the purposes of the invention, reagents of the general formula expressed below are also suitable:

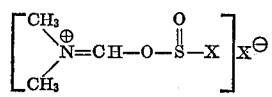

where X is bromine or fluorine; however, the reagent is preferably chosen when X is a chlorine atom except when, for example, in the case of the mandelic acids, when the requirement is to obtain optically active and racemic alpha-bromo or alpha-fluoro phenylacetic acids.

Following a similar technique and using thionyl bromides or thionyl fluorides, the preparation of which is described in the literature, it is easy and practical to obtain the corresponding reagent for immediate use. The combination of an acid with dimethylformiminium halosulfite N-halides is achieved by the simple addition of the carboxylic compound with stirring at temperatures of −30 to 25°, with reaction times varying from 30 minutes to 2 hours depending on the nature of the acid and on the working temperature. Suitable solvents are all those known and usual in organic chemistry. Among others it is possible to select chloroform, dichloroethane, methylene chloride, benzene, dioxane, dimethylformamide, hexamethylphosphorotriamide, tetrahydrofuran, acetonitrile, but at all times an attempt should be made to have them free from moisture or, if necessary, it should be destroyed previously, even by using a calculated amount or reagent.

For subsequent combination of the 6-amino-penicillanic acid (6–APA) it is sufficient to add the reaction product of the acid and the reagent to a suspension of 6-APA in an inert solvent, together with sufficient inorganic tertiary base to neutralize the liberated mineral acid, which may be either hydrochloric, hydrobromic or hydrofluoric acid. Finally the alpha substituted benzylpenicillin is isolated from the organic phase, washed first in water, then dried with anhydrous sodium sulfate and the solvent is evaporated at reduced pressure. If the sodium salts are desired, it is sufficient to add sodium 2-ethylhexanoate and they are isolated from the reaction medium by filtration of the precipitate or evaporation of the solvent.

Results defined by the new process and which may be considered as surprising are the inalterability of the optical activity of the acid used, the very gentle or moderate experimental operative conditions which, for example in the case of D(−) alpha methoxyphenylacetic acid, the acid chloride of which quickly decomposes (K. Freudember et al., Liebigs Ann. Chemie, 501, 218, 1933), allow the corresponding benzylpenicillin to be obtained and, in the case of malonic acids, they allow an intermediate to be obtained by combination with the reagent, which intermediate, in the case of phenylmalonic acid, allows direct preparation of alpha-carboxybenzyl penicillin. L(+) mandelic acid and dimethylformiminium bromosulfite N-bromide give D(−) alpha-bromophenylacetic acid and L(+) mandelic acid with dimethylformiminium fluorosulfite N-fluoride give D(−) alpha-fluorophenylacetic acid, which acids combine with 6-APA acid to give rise to the formation of the respective alpha substituted benzylpenicillins.

The outstanding importance of the dimethylforminium halosulfite N-halide reagents, for example, dimethylformiminium chlorosulfite N-chloride, has allowed excellent solutions to be achieved in the field of penicillins and the establishment of a new sequence in the preparation of the Formula III compounds where, in the case of R=NH$_2$ or R=—NH—CO—, for the first time a stereochemical relation is defined from optically active mandelic acids:

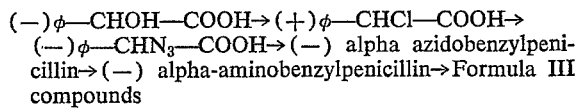

(−)φ—CHOH—COOH→(+)φ—CHCl—COOH→
(−)φ—CHN$_3$—COOH→(−) alpha azidobenzylpenicillin→(−) alpha-aminobenzylpenicillin→Formula III compounds Numerous processes are described in the literature for obtaining D(−) and L(+) mandelic acids by resolution of the racemic compound and it is also known that the optically active mandelic acids, when treated with thionyl chloride, undergo partial racemization and decomposition, the same as happens when phosphor chloride is used. On the other hand, under very moderate conditions, with dimethylformiminium chlorosulfite N-chloride, a 100% inversion with quantitative yield is obtained in the formation of alpha-chlorophenyl-acetic acid; this compound, with sodium azide, dimethylformamide, dimethylsulfoxide or hexamethylphosphorotriamide, gives rise to alpha-azide phenylacetic acid with a 100% inversion and 80–90% yield. It is obvious that L(+) mandelic acid, later racemized by known methods, allows more D(−) mandelic acid to be obtained by a new resolution, whereby the process is characterized, apart from its simplicity, by the high yields and stereospecific transformation.

According to the present invention, the dimethylformiminium chlorosulfite N-chloride reagent takes part in the new process in three fundamental stages of extreme interest, such as the easy preparation of the alpha chlorophenylacetic acid with an inverted configuration with respect to the mandelic acid used, in the preparation of the alpha-azidobenzylpenicillin and finally in obtaining of the compounds according to the General Formula III.

Among these last named Formula III substances, with R supporting a new acyl group such as a phenylmalonic acid benzylic semiester, the dimethylformiminium chlorosulfite N-chloride reagent acquires further importance in the preparation of these semiesters and their later combination with the alpha-aminobenzylpenicillin or, in its absence, as an alternative, the semiester may combine with the D(−), alpha-phenylglycine and the resulting product, with the aid of the same reagent, with the 6-aminopenicillanic acid of suitable structure, to obtain the products of the aforementioned Formula III.

The process covered by the present invention provides an advantageous new method for obtaining alpha-aminobenzylpenicillins, with an outstanding alternative possibility of using the optically active mandelic acids or racemic mandelic acid. In this case, it is necessary to have a suitable method for splitting up the racemic alpha-azidophenylacetic acid, until now non-existent or unknown.

A new process is now described for the resolution of racemic compounds such as the D,L-threo-1, p-nitrophenyl-2-amino-1,3 propandiol base and the D,L-alpha-azido-phenylacetic acid, both of which are of interest and involved, respectively, in the preparation of the compounds chloramphenicol, optically active alpha-aminobenzylpenicillin and alpha-phenylglycine, the latter used in the process of manufacturing the well known antibiotic, alpha-aminobenzylpenicillin, according to patents mentioned hereinafter.

It is known that alpha-phenylglycine is obtained in racemic form with a maximum yield of 37% (Org. Synt. Coll., vol. III, 84, 1955) equally from optically active alpha-chlorophenylacetic acid and ammonia (G. Senter and H. D. K. Drew, J. Chem. Soc., 107, 641, 1915), likewise resolution with camphosulfonic acid does not allow the use of the enantiomer L(+). It is also difficult to recover the resolution agent on an industrial basis.

In the case of the racemic base of the chloramphenicol, it presents the industrial technical problem of the preservation of the solutions which are easily alterable by the microorganisms in the environment, which microorganisms decompose the base, and alter and render impure the medium used for the resolution, based on the inoculation of one of the diastereoisomers. Also the residual L(+) compound is unusable from an economic point of view.

Alpha-azidophenylacetic acid, obtained by Derapsky (J. Prak. Chem., 2, 99, 222–3, 1919) with a yield of 23.7%, may not be split down into its optically active components. Now it has been discovered that the D(−) and L(+) alpha-azidophenylacetic acids are useful for the resolution of the racemic base of chloramphenicol and, reciprocally, that the D(−) and L(+) bases of chloramphenicol allow for a simple splitting down of racemic alpha-azidophenylacetic acid, in such a way that the result of a suitable combination is four diastereoisomeric salts useful for obtaining the D(−) base of chloramphenicol and the D(−) alpha azidophenylacetic acid, from which D(−) adpha-phenylglycine is obtained by way of hydrogenolysis in the presence of catalysts of the platinum group.

The importance of this discovery is enhanced even more when it is considered that these products are used in the manufacturing processes of the important antibiotics chloramphenicol and alpha-aminobenzylpenicillin, in such a way that one part of the L(+) acid resulting from the above-mentioned penicillin process is racemized in a base medium for further use and the other part is used in the process of splitting up the chloramphenicol racemic base, giving as a result the L(+) base which is used to split up the racemic alpha-azidophenylacetic acid.

The preparation of the racemic acid, with a yield of 80 to 95% of the theoretical value, is achieved by using as solvents dimethylformamide, dimethylsulfoxide or hexamethylphosphorotriamide at moderate temperature and in a short time. This method is more advantageous than the method described by Darapski (loc. cit.). When splitting up this compound, it does not matter whether the D(−) or the L(+) base of chloramphenicol is used, however, one or the other is chosen according to the optically active acid required, thus for example, it has already been said above that the L(+)-threo base for the D(−) acid and the L(+) acid for the D(−)-threo base of the chloramphenicol are preferable.

The process consists in preparing the diastereoisomeric salts of R-alpha-azidophenylacetic acid (R=racemic) and the L(+)-threo-1-p-nitrophenyl-2-amino - 1,3-propanediol base in a suitable solvent, such as acetone, easily evaporated at reduced pressure or in a higher acetone such as methyl-isobutylketone, from which the mixture of salts is precipitated and isolated for later splitting up. However, the prior isolation of the salt mixture is not necessary and simultaneously with their formation in a solvent, a further solvent, selective for one of said salts, is added to provoke splitting and give rise to the precipitation of the most insoluble one. Thus, for example, the laevo-acid/dextro-threo-base diastereoisomer is separated preferably from a supersaturated solution of the salts in acetone by addition of methylene chloride, whilst the dextro-acid/dextro-threo-base remain in solution. It is obvious that any other pair of solvents, different from the acetone/methylene chloride pair, may be used, such as for example ethyl acetate/methylene chloride, methanol/methylene chloride. Among these, the indicated one is preferable since it is cheap and easy to recover. The diastereoisomer, recovered by filtration, is recrystallized in ethanol or in water for final purification.

An identical process is used to split the racemic bases of chloramphenicol by preparing the diastereoisomeric salts with L(+)-alpha-azidophenylacetic acid and in this case the insoluble salt is the L(+) acid/D(−)-threo-base which is purified by recrystallization in ethanol or in water, among other solvents.

In the mother liquors resulting from the isolation of the opposed sign salts, the diastereoisomers of the contraries to the same sign are recovered, either by evaporation of the solvent, precipitation by addition of excess solvent or the base is directly isolated by extraction with acidulated water, whilst the acid remains in the organic phase.

It is easy to obtain the optically active acids and bases easily and quantitatively from the isolated diastereoisomers by the use of known methods, that is, a suspension of the salt in water, treatment with an acid such as hydrochloric acid and then the optically active acid is extracted with a solvent, such as ether, chloroform, methylene chloride or other usual solvents, from which the acid is finally removed by distilling. With the addition of an inorganic base such as sodium hydroxide, the corresponding optically active base is precipitated out of the water phase.

The reduction of the D(−) alpha-azidophenylacetic acid may be performed in an aqueous medium, the reduction of the sodium salt in an aqueous-alcoholic medium, of the acid in acetic acid, etc., with metals of the platinum group. In the case of the sodium salt, after separating the catalyst by filtering, the pH is adjusted to the isoelectric point of the aminoacid for its precipitation.

This aminoacid is used for the preparation of the alpha-aminobenzylpenicillin, by known processes, such as those described in the U.S. Pats. No. 2,985,648, No. 3,268,513, in the paper by Dane and Dockner (Ber., 789, 1965) and like the carbenzyloxy group, the N-1-methyl-2-ethoxy-carbonylvinyl-D(−) alpha-aminophenylacetic derivative may be used with the reagent described in this patent.

The new process consists essentially in the preparation of the dimethylformiminium halosulfite-N-halide, in adding the selected inorganic salt or tertiary amine salt acid and finally the product of this combination is gradually poured over the medium containing an amine, hydrazine or alcohol compound, according to the derivative one wants to obtain and the isolation of the product formed is achieved by usual techniques. It will be easy for experts in the matter to understand the extension of the process in the preparation of known or new substances with an amide, hydrazide and ester function, by using carboxylic acids which are not limited to those mentioned, the concept and definition of which is clearly determined and specified in Chemistry Treatises and in IUPAC Nomenclature Congresses.

EXAMPLE 1

General process

To a solution of 36.4 ml. of thionyl chloride (0.5 mole) in 150 ml. of benzene, there is added 46.3 ml. of dimethylformamide (0.55 mole); the reaction produced is moderately exothermic and reaches an interior temperature of 30°. After a few minutes the whole mass grows turbid and two phases appear, the lower one corresponding to the reagent (0.5 mole). Then cooling is applied (−10° to 25°) and whilst the mixture is being continuously stirred, 0.45 to 0.5 mole of acid, its alkaline salt or salt of a tertiary organic base is added over a period of 30 minutes. The interior temperature is controlled with external cooling to a maximum of 25° according to the exothermic effect produced by the reaction. Then the mixture is allowed to reach room temperature (20–25°) in processes carried out at lower temperatures and stirring is continued for 30 to 90 minutes, to produce a solution or a mixture of phases, according to the nature of the acid used.

The solvent (benzene) used in the preparation of the reagent, may be replaced, according to the solubility of the acid, by other more suitable ones, such as chlorobenzene, toluene, xylenes, dioxane, tetrahydrofuran, ethylene glycol dimethylether, etc. When working with alkaline salts, any solvent may be used. In general, the amount may be varied to suit conveniences.

The mixture resulting from the above reaction is poured gradually over a cooled solution containing 0.5 mole of an amine, a hydrazine or alcohol in an inert organic medium, in the presence of a tertiary triethylamine base when it is necessary to eliminate the liberated hydrochloric acid. An excess amount of amine or hydrazine is also useful, especially when its recovery is simple. When preparing derivatives of ammonia or hydrazine, it is sufficient to add the mixture over an excess aqueous solution of the above compounds. The reverse technique may be used to obtain esters, that is, direct addition of the alcohol over the reaction mass.

The isolation of the product formed—amide, hydrazide or ester—is achieved in each case by use of the normal filtration, extraction or distilling techniques, followed by purification through recrystallization in suitable solvents, known to be useful for these substances.

EXAMPLE 2

Dimethylformiminium chlorosulfite N-chloride

To a solution of 36 g. thionyl chloride (freshly distilled after treatment with linseed oil) in 100 ml. of chlorobenzene, there was added 25 g. of dimethylformamide (freshly distilled) at room temperature. After a turbid appearance had developed through the whole mass, it was left to stand and the lower phase was decanted over 100 ml. of anhydrous 1,2-dimethoxytane and cooled to 0 degrees. Keeping it from humidity, the oil was shaken and crystallized as a bulky white solid. It was filtered in a dry nitrogen atmosphere and after having been dried under vacuum, a quantitative yield of dimethylformiminium chlorosulphite chloride, useful for the preparation of particularly delicate compounds, according to the technique described in the previous example.

The compound is highly hygroscopic, making it impossible to determine the UV spectrum, and the approximate value of 85–90° (d.) was established as the melting point. The IR spectrum of a sample, amongst sodium chloride crystals, determined in a Perkin Elmer, Model 457, spectrophotometer, shows an intense band at 5.93μ due to the

group. Sulfur found: 16.41%. Calculated: 16.69%.

EXAMPLE 3

Alpha-trichloroacetylamine-p-nitrophenacyl

Proceeding as in Example 1, using one-third of solvent and 85 g. of trichloroacetic acid dissolved in 50 ml. of benzene, the intermediate reagent was prepared. Following this, it was poured rapidly over a stirred suspension of 49.28 g. (0.10 mole) of alpha-amino-p-nitrophenacyl tosylate in 225 ml. of dimethylformamide, chilled slightly, to keep the final temperature down to a level not exceeding 35–40° (exothermic reaction); the result was a yellowish solution which dissolved in 1000 ml. of water after 15 minutes (in this time the solution of tosylate residues took place). After the larger part of the water phase had been decanted off and the benzenic part had been washed with several further portions of water (1000 ml.), it was chilled in an ice bath and crystallization begins. After 30 minutes, the crystals were filtered and washed with about 70 ml. of previously chilled ethanol. The benzenic fraction (filtration liquors), when concentrated at reduced pressure, provided a further portion. All in all 44.24 gr. of a white crystalline solid, M.P.=130–1° (ethanol) were obtained in a practically quantitative yield.

EXAMPLE 4

Trifluoroacetyl derivatives

Over a stirred mixture of 0.1 mole of dimethylformiminium chlorosulfite chloride in 15 ml. of benzene, prepared according to Example 1 and chilled to between 5 and 10°, there was added gradually 0.1 mole (11.4 gr.) of trifluoroacetic acid; the liberated gas was absorbed into an externally chilled benzene or dimethylformamide solution containing an aminated compound. At the end it was allowed to reach room temperature in order to complete the liberation of trifluoroacetyl chloride. When the dimethylformamide reaction product was diluted in water, the trifluoroacetylated product was precipitated. It was isolated from the benzene by filtration or by distilling the solvent at reduced pressure. By picking the gas up directly over an alcohol, the relative trifluoroacetates were isolated in a practically quantitative yield. With aniline, the anilide M.P.=88° was obtained and with ethanol, the ester B.P. 60°.

EXAMPLE 5

4-chloro-N-methyl-3 (methylsulfamyl) benzamide

With continuous stirring, 0.5 mole of 4-chloro-3-chlorosulphonylbenzoic acid was added to 0.5 mole of dimethylformiminium chlorosulfite chloride prepared according to Example 1 and after being left for 60 minutes at room temperature, it was gradually poured over an excess aqueous solution of 30% mono-methylamine with external chilling. The precipitate was filtered, washed with water and dried, producing 123.50, M.P.=165° with a yield of 96% of the theoretical value. When added over an ammonia solution, 4-chloro-3-sulfamylbenzamide was produced with the same yield and M.P.=238–30°.

EXAMPLE 6

2-diethylaminoethyl alpha-chloro-diphenylacetate

Proceeding as in Example 1, with sodium alpha-hydroxydiphenylacetate was diethylamine ethanol, the ester, M.P.=149–151° was obtained, in a quantitative yield.

EXAMPLE 7

Meso-inositol hexanicotinate

Proceeding as in Example 1, with 0.5 mole of nicotinic acid and 0.08 mole of anhydrous inositol, the reaction was completed by heating. After diluting the reaction product in water and evaporating the benzene, the ester was isolated; insoluble in water, M.P.=254–5° with an 89–93% yield.

EXAMPLE 8

Hexestrol dipropionate

Proceeding as in Example 1, using propionic acid and hexestrol, the propionate was obtained, M.P.=127–8°. By using stilbestrol, the relative dipropionate was obtained, by evaporation of the solvent.

EXAMPLE 9

Alpha-chlorophenylacetamide

Proceeding as in Example 1, using amounts corresponding to 1 mole of dimethylformiminium chlorosulfite chloride and 0.45 mole of mandelic acid, after holding the reaction mass for 1½ hours with stirring at room temperature, it was poured over an excess aqueous solution of ammonia, previously chilled. This was followed by decantation of the liquid from the semi-solid mass; this latter was washed with several portions of water and filtered. The evaporated benzene left a further portion of solid and the resulting product was alpha-chlorophenylacetamide in an almost quantitative yield, M.P.=116–117°.

EXAMPLE 10

Alpha-chlorophenylacetic acid

Instead of adding the reaction mass obtained in Example 9 over ammonia, it was poured over 750 ml. of water; this was followed by decantation of the benzene phase and extraction with further benzene. The organic fractions were combined, and the solvent distilled to leave about 100 g. of residual oil. To this oil there was added 250 ml. of concentrated hydrochloric acid and a few drops of sodium dioctylsulfosuccinate. Crystallization rapidly took place with chilling in an ice bath and stirring; this was followed by dilution in 250 ml. water, filtration and washing to give 75.3 g. of alpha-chlorophenylacetic acid with M.P.=78° and a yield of 98% of the theoretical value.

EXAMPLE 11

Alpha-chlorophenylacetylhydrazide

According to Example 9, alpha-chlorophenylacetic acid was used and the reaction mass was poured over a sharply chilled 30% solution of hydrazine hydrate. A good yield of alpha-chlorophenylacetylhydrazide was isolated.

EXAMPLE 12

2,6-dimethoxyphenylpenicillin

Proceeding as in Example 1 and using 102.07 g. (0.5 mole) of the sodium salt of 2,6-dimethoxybenzoic acid, the resulting mixture was poured gradually, over a period of 60 minutes and with stirring, over a suspension of 108.12 gr. (0.5 mol) of 6-aminopenicillanic acid and 140 ml. of triethylamine in 1400 ml. of chloroform, with chilling in an ice bath. Then it was held at room temperature for 30 to 60 minutes with stirring to complete the transformation. This was followed by the addition of about 500 ml. of dilute hydrochloric acid until the pH of the aqueous phase reached 2.0. The chloroform was decanted, the remaining mass was washed with water and stirred with 130 ml. water with bicarbonate of soda being added in portions until the pH of 7-8 remained constant. The aqueous phase was decanted, the remaining mass was washed with ethyl acetate and finally diluted with acetone, whilst chilling. The precipitate obtained was filtered and washed with acetone, to give 176.9 gr. of sodium salt mono hydrate with a yield of 84% of the theoretical value, M.P.=181° and $[\alpha]_D^{20}=+230°$ (c.=5, water).

EXAMPLE 13

Alpha-chlorobenzylpenicillin

Proceeding as in Examples 1 and 12, using mandelic acid and the corresponding equivalents of triethylamine, the result was the sodium salt of alpha-chlorobenzylpenicillin, in an aqueous solution. Paper chromatography showed the existence of an antibiotic with $R_F$ of a different value from the starting material, with inhibition of a Staph. aureus culture.

EXAMPLE 14

Alpha-azidobenzylpenicillin and alpha-aminobenzylpenicillin

Proceeding as in Example I and using the sodium salt of alpha-azidophenylacetic acid and proceeding as in Example 12, the result was a solution of the sodium salt of alpha-azidobenzylpenicillin with $R_F$ of a different value from the starting material, with inhibition of the growth of a Staph. aureus culture.

The above solution, 500 ml., containing approximately 10% of alpha-azidobenzylpenicillin was mixed with 300 ml. of a suspension of Pd-barium carbonate (80 g., 25%) previously shaken with hydrogen. It was hydrogenated at room temperature with a slight overpressure of hydrogen, following known techniques. After elimination of the catalyst by filtration, the pH was adjusted to 1.5/2.0, extracted with chloroform and then the pH of the aqueous phase was adjusted to between 5 and 6. The aqueous liquors were concentrated at reduced pressure and when diluted with acetone, 39 gr. of alpha-aminobenzylpenicillin monohydrate were precipitated with a yield of 85% of the theoretical value; M.P.=201-2° (d.) and $$[\alpha]_D^{20}=+280.50$$

(c.=1, water). The specific rotation varied notably with the concentration.

EXAMPLE 15

Alpha-chloro-phenylacetylurea

Following the general technique of Example 1 and Example 9, with sodium mandelate and urea, the corresponding carbamide derivative was isolated with M.P.=199-200° (d.). When phenylacetic acid and urea were used, the result was phenacetylurea, M.P.=212-216° (Spielman et al., J. Am. Chem. Soc., 70, 4148 (1948)).

EXAMPLE 16

Phenoxymethylpenicillin

Proceeding as in Example 2, using sodium phenoxyacetate and 6-aminopenicillanic acid, the resulting product was phenoxymethylpencillin (acid), M.P.=120-8°, which was isolated from the reaction medium by Glombitza's technique (Ann., 673, 166, 1964).

EXAMPLE 17

D(−) alpha-fluorbenzylpenicillin

To a solution of 9.77 g. of dimethylformiminium fluorosulfite N-fluoride in 15 ml. of methylene chloride, prepared with 0.06 mole of thionyl fluoride and 0.06 mole of dimethylformamide at −10°, there was added in parts 3.04 gr. of L(+) mandelic acid and the mixture was stirred for two hours at −5 to 0°. Then it was poured gradually over a suspension of 4.32 g. of 6-aminopenicillanic acid in 75 ml. of methylene chloride at −5°, controlling the pH to 6.0 with the simultaneous addition of triethylamine. Then the stirring was continued for another two hours and 50 ml. of acidulated water was added; the organic phase was decanted and, after being washed with more water and dried with anhydrous sodium sulfate, the solvent was evaporated at reduced pressure and the residue was digested several times with n-hexane, the result being 5.8 gr. of the above mentioned penicillin at 88% purity, controlled against a master sample of penicillin. It exhibited a different $R_F$ value from the starting products and inhibited the growth of a Staph. aureus culture.

EXAMPLE 18

Alpha-carboxy-benzylpenicillin

To a suspension of 3.60 gr. of phenylmalonic acid in 15 ml. of methylene chloride, there was added, over a period of 15 to 30 minutes, a solution of 3.90 gr. of dimethylformiminium chlorosulfite chloride in 5 ml. of methylene chloride, controlling the temperature to between 0° and 10°. Then this mixture was stirred for about six hours to give a solution which, over a period of about 30 minutes, was poured gradually over a suspension of 4.32 gr. of 6-aminopenicillanic acid in 50 ml. of methylene chloride and 10 ml. of triethylamine, with external chilling to −5 to 0°. Then it was allowed to reach room temperature and stirred for one hour at 15-20°. It was then chilled, 50 ml. of acidulated water were added and after stirring and adjusting the pH to 5.0, the organic phase was decanted, dried with sodium sulfate and the solvent was evaporated at reduced pressure. This gave 7 gr. of oil which were dissolved in methylisobutylacetone, 20 ml. of 33% sodium ethyl-butylacetate in the above ketone were added and after chilling in a cooling bath, the white, sodium salt precipitate was filtered, washed with ethyl ether and dried. This gave alpha-carboxybenzylpenicillin with 98% purity, calculated by the hydroxylamine test against a penicillin specimen. The compound had a different $R_F$ value from the starting products and in the IR spectrum gave the band corresponding to the amide function of the beta-lactam ring.

EXAMPLE 12

D(−) alpha-methoxybenzylpenicillin

To a solution of 3.90 gr. of dimethylformiminium chlorosulfite N-chloride in 10 ml. of methylene chloride, there was added at 0° 3.32 gr. of D(−) alpha-methoxyphenylacetic acid, prepared according to McKenzie and Wren's method (J. Chem. Soc., 97, 484, 1910) and after achievmethod (J. Chem. Soc., 97, 484, 1910) and after achieving the solution, it was held at 5° for half an hour. Afterwards, it was gradually poured over a suspension of 4.32 gr. of 6-aminopenicillanic acid in 50 ml. of methylene chloride and 8 ml. of triethylamine, controlling the temperature at 0°. Then it was stirred for 1½ hours; then 50 ml. of acidulated water were poured in with adjustment to pH 5. The organic phase was recanted, dried and the solvent was evaporated at reduced pressure. The residue was steeped in n-heptane, to give 6.8 gr. of a solid product with 95% purity, when determined with the hydroxylamine test. The compound had a different $R_F$ value from the starting products and a band to 1780 cm.$^{-1}$ corresponding to the function of the beta-lactam ring.

EXAMPLE 20

D(−) alpha-bromobenzylpenicillin

Proceeding as in Example 1 and using dimethylformiminium bromosulfite N-bromide, the above mentioned compound was isolated. It had a different $R_F$ value from the starting products.

EXAMPLE 21

(+) alpha-trifluormethyl-benzylpenicillin

In accordance with the technique described by Mosher et al. for the preparation of phenylacetic acids, with dimethylformiminium chlorosulfite N-chloride, using (+) alpha-trifluormethyl-phenylacetic acid and following the 1st, 2nd and 3rd examples, the corresponding benzylpenicillin was obtained, with a band in the infrared spectrum approximately between 1760 and 1785 cm.$^{-1}$, corresponding to the beta-lactam ring (Bellamy, IR-Spectrum of Complex Molecules, London, 1962, p. 214).

EXAMPLE 22

L(+) alpha-chlorophenylacetic acid

To a solution of dimethylformiminium chlorosulfite N-chloride in 250 ml. of methylene chloride, prepared with 102 ml. of dimethylformamide and 87 ml. of thionyl chloride, there was added 60.8 gr. of D(−) mandelic acid over a period of 15 to 30 minutes, with efficient stirring and controlling the internal temperature of the solution to −12/−10°. Once this addition was finished, it was held at −10° for 2 hours and for 30 minutes at 0–5°. Then ice and 500 ml. of water were added. The organic phase was decanated and the aqueous phase was extracted with a further portion of methylene chloride. The organic extracts were combined, washed with water and dried with anhydrous sodium sulfate, the solvent was distilled at reduced pressure to give 60 grams of alpha-chlorophenylacetic acid, with a quantitative yield, M.P.=60–1° C. and $[\alpha]_D^{19}=+193.7°$ (c.=2.012%, 1 dm. benzene).

D(−) alpha-azido-phenylacetic acid

A solution of 68 gr. of L(+) alpha-chlorophenylacetic acid in 150 ml. of dimethylsulfoxide was neutralized with a solution of 33 gr. of 48% sodium hydroxide diluted in 30 ml. water, with pH adjusted to the value of the dimethylsulfoxide. Then a further solution of 50 g. of sodium azide in 120 ml. of water was added and the mixture was heated at 40° for 3 hours. Then it was cooled and 200 ml. of water and 200 ml. of concentrated hydrochloride acid were added. The oil which separated was extracted with methylene chloride, the extracts were washed, dried with anhydrous sodium sulfate and after evaporation of the solvent, the result was 88 gr. of oil which contained some dimethylsulfoxide and D(−) mandelic acid, and containing 85% of alpha-azido phenylacetic acid, determined by the rotatory power and the nitrogen content.

When the oil was dissolved in acetone with the corresponding amount of chloramphenicol L(+) threo-base, followed by evaporation of the solvent at reduced pressure and dissolution of the oil in methylene chloride, there was a quantitative precipitation of the salt which, suspended in water with hydrochloric acid, gave D(−) alpha-azidophenylacetic acid with an optical activity of $$[\alpha]_D^{22}=-164.4°$$

(DMSO).

D(−) alpha-azidobenzylpenicillin and D(−) alpha-aminobenzylpenicillin

Following the techniques described under Examples 1, 12 and 23, the above mentioned penicillins were obtained.

EXAMPLE 23

Benzylic semiesters of phenylmalonic acid

A suspension of dimethylformiminium chlorosulfite chloride prepared from 10.71 ml. of dimethylformamide and 9.15 ml. of thionyl chloride in 30 ml. of benzene was added gradually, while being well stirred to a further suspension of 21.6 gr. of phenylmalonic acid in 100 ml. of benzene, with the internal temperature controlled to between 8 and 10°. Then the mixture was allowed to reach room temperature and was stirred for four hours. This was followed by cooling to 10° and 14 ml. of benzyl alcohol diluted in 20 ml. of benzene are added, the mixture was allowed to rise to the temperature of 20° and after 15 minutes was cooled and 200 ml. of water are added with good stirring.

The benzenic phase was decanted and extracted with more benzene, the extracts are combined and dried with anhydrous sodium sulfate, the solvent was evaporated to leave 33 gr. of oil. This was then suspended in 100 ml. of water and bicarbonate of soda was added until a pH=8 was reached, the result being a solution with traces of oil in suspension. The solution was extracted with benzene and the pH of the clear water phase was adjusted to 1 to 2 with concentrated hydrochloric acid. The oil which separated out was extracted with methylene chloride, the extracts are dried with sodium sulfate and after evaporation of the solvent the result was an oil to which, when dissolved in 25 ml. of benzene, there was added 25 ml. of n-hexane and the solution was chilled in an ice and water bath with stirring. The benzylic semiester crystallized was washed with n-hexane benzene and dried. The result was 19.0 gr. with M.P.=62–2° C.

When p-methoxybenzyl alcohol, alpha-methylphenylcarbinol, p-chlorophenylcarbinol are used instead of benzyl alcohol, the relative benzyl semiesters were obtained. In the case of diphenylcarbinol, the corresponding phenylmalonic semiester has a M.P.=109–14°.

Benzyl semiesters of D(−) alpha-aminobenzylpenicillin (a) To a solution of dimethylformiminium chlorosulfite N-chloride, prepared in the absence of moisture, with 0.725 ml. of thionyl chloride and 0.842 ml. of dimethylformamide in 5 ml. of methylene chloride, there were added 2.7 gr. of benzyl semiester or the stoichiometric quantity of a benzyl semiester or of diphenylcarbinol. After 30 minutes, this was added gradually, taking 15 to 30 minutes to perform the addition, with stirring and controlling the internal temperature to between 0 and 5°, over a solution of 6 gr. of D(−) alpha-aminobenzylpenicillin in 50 ml. of methylene chloride and 5 ml. of triethylamine. The internal temperature was then allowed to rise to 10–15° and after 30 minutes it was cooled and diluted with 50 ml. of water, with the pH controlled to 6. 2.5 ml. of concentrated hydrochloric acid was added to bring the pH to 1. The organic phase was decanted, washed with water, dried with anhydrous sodium sulfate and the solvent was evaporated at reduced pressure, leaving 6.01 gr. of oil from which, after being digested with ether and finally with n-heptane, there was isolated 4.3 gr. of a white solid with M.P.=135–140° (d.) corresponding to the benzyl semiester of D(−)alphaaminobenzylpenicillin, with $R_F$ different from the starting products. The different derivatives of aminobenzylpenicillin and the corresponding semiesters present a different $R_F$ value from that of the starting products and in the IR spectra they all show the characteristic bands due to the ester and amide groups and beta-lactam ring. These substances inhibit the growth of Staph. aureus and E. coli cultures.

(b) Following method (a) the reagent and benzyl semiester solution was added gradually to a suspension of 1.5 gr. of D(−) alpha-phenylglycine in methylene chloride and triethylamine to give the acyl derivative of the aminoacid which, in methylene chloride with the stoichiometric quantity of dimethylformiminium chlorosulfite N-chloride, after remaining for 30 minutes at room temperature, was added over 2.7 gr. of 6-aminopenicillanic acid in methylene chloride and triethylamine, with the pH controlled to 6. Then the process as described above was followed to isolate D(−) alpha-aminobenzylpenicillin benzyl semiester.

EXAMPLE 24

D,L-alpha-azidophenylacetic acid

A solution of 68 g. of D,L-alpha-chlorophenylacetic acid, prepared according to Example 10, in 150 ml. of dimethylsulfoxide, was neutralized with a further solution of 33 gr. of 48% sodium hydroxide diluted in 30 ml. of water. This was followed by the addition of a further solution of 50 gr. of sodium azide in 120 ml. of water and the mixture was stirred and heated to 50–60° for two hours. Then it was diluted with 200 ml. water and cooled, there then being poured in 150 ml. of hydrochloric acid. The oil which separated out was extracted with methylene chloride, dried and the solvent was distilled at reduced pressure. The resulting product crystallized by dissolution in benzene and cooling. By evaporation of the solvent and recrystallization, further portions were obtained from the mother liquors to provide a total of 60.9 gr. of acid with a yield of 87% of the theoretical figure and M.P.=99–103° (d.).

EXAMPLE 25

D(−) alpha-azidophenylacetic acid

A solution of 212.5 gr. of acid obtained according to Example 1, dissolved in 900 ml. of acetone was neutralized with 254.6 gr. of L(+) threo-1-, p-nitrophenyl-2-amino-1,3-propanediol. The resulting solution was concentrated to a small volume by distilling the solvent at low pressure. Then, the resulting oil, which still contained a certain amount of acetone, was dissolved with stirring and gently heating in 3 liters of methylene chloride. Almost immediately the separation of the diastereoisomer of the D(−) acid and L(+) base starts. After two hours, this is filtered, washed with more methylene chloride and dried, to give 233 gr. of a white solid. Then it is dissolved with gentle boiling in 2.4 liters of 99% ethanol, and recrystallized when left to cool to room temperature. The result was 196 gr. of pure product with M.P. 151–3°. The remainder was recrystallized out of the ethanol liquors on their being evaporated, to provide a further portion.

The 196 gr. of the diastereoisomer were suspended in 500 ml. of water and 500 ml. of methylene chloride and 100 ml. of concentrated hydrochloric acid were added with stirring. The lower organic phase, after being washed, was decanted, dried and the solvent was evaporated at reduced pressure to give 88 gr. of D(−) alpha-azidophenylacetic acid, with a practically quantitative yield, M.P.=50–57° (d.) and $[\alpha]_D^{22}$=−146.5 (DMSO). Another 10.5 gr. were isolated from the recovered, recrystallized diastereoisomer, to make a total of 98.5 gr.

L(+) alpha-azidophenylacetic acid

The mother liquors from the preparation of the D(−) and acid/L(+) threo base diastereoisomer were extracted with 500 ml. of water containing 100 ml. of concentrated hydrochloric acid. The organic phase was dried and distilled at reduced pressure, to provide an oil which finally solidified to give 105 gr. of L(+) alpha-azidophenylacetic acid. By recrystallization in benzene, first of all a portion with low rotatory power was obtained, then, with the addition of n-heptane, an optically pure acid was obtained with M.P.=52–57° and $[\alpha]_D^{22}$=+146.4 (DMSO).

The low rotatory power fraction was racemized by heating a solution in a base medium.

When chloramphenicol D(−) threo base was used according to the foregoing method of this example, the L(+) acid/D(−) threo base diastereoisomer was isolated with the same yield and M.P.=151–3° (d.).

If, instead of extracting the mother liquors with an aqueous solution, these were evaporated at reduced pressure and the residue was dissolved in a minimum amount of ethyl acetate and afterwards diluted with methylene chloride, the result was the precipitation of the diastereoisomers D(−) acid-D(−) threo base or L(+) acid-L(+) threo base with M.P.=68–70°.

EXAMPLE 26

D(−) threo-1-p-nitrophenyl-2-amino-1,3-propanediol

Use of the (+) acid. A solution of 106.3 gr. of L(+) alpha-azidophenylacetic acid in 900 ml. of acetone was neutralized with 127.3 gr. of chloramphenical D,L threo base. The resulting solution was concentrated at reduced pressure and the resulting oil was dissolved, with heating, in 1.5 liters of methylene chloride. Almost immediately the precipitation of the D(−) base and L(+) acid diastereoisomer starts. After two hours, this was filtered and washed with methylene chloride, with the isolation of 117–120 gr. of salt. It was then dissolved in 1.2 liters of 99% ethanol and recrystallized, by leaving to cool slowly to room temperature. The result was 98 gr. of pure product with M.P. 151–3°. The rest was recovered by evaporation of the ethanol liquors and on recrystallization it produced a further portion. In total 116 gr. The L(+) base-L(+) acid diastereoisomer remained in solution in the mother liquors.

The D(−) base-L(+) acid diastereoisomer was added to a mixture of 250 ml. of water, 250 ml. of methylene chloride and 50 ml. of concentrated hydrochloric acid, the phases were stirred and the organic phase, from which the L(+) acid was isolated as described in Example 23, was decanted.

The pH of the decanted aqueous phase was adjusted to 9–10 with sodium hydroxide solution and the D(−) threo base precipitated almost immediately. It was filtered and finally washed, stirring a water suspension at a temperature of 40–60°. 60.6 gr. of pure base were obtained with M.P.=162–4° and $[\alpha]_D^{25}$=−39.4° (DMSO).

Proceeding in the same manner with the aqueous liquors of the Example 23, the optically active bases were obtained.

After isolation of the D(−) base-L(+) acid, the mother liquors were extracted with an aqueous solution of hydrochloric acid and after decantation of the organic phase, sodium hydroxide solution was added to obtain 60.6 gr. of chloramphenicol L(+) threo base with M.P.=162–4° and a 95% yield with respect to the theoretical value; $[a]_D^{25}$=+39.5° (DMSO).

EXAMPLE 27

D(−) acid-L(+) base and L(+) acid and D(−) base diastereoisomeric salts

Proceeding in the same way as in Examples 23 and 24, the diastereoisomeric salts are isolated. These, when operating at higher concentrations, produced an entrainment of the diastereoisomer of the same sign. They were purified by crystallization from their solution in water or in dioxane or in methylisobutylketone or in isopropanol to give a pure product with M.P.=155–7° (d.).

Also by reprecipitation: To a solution of 100 gr. of 95% diastereoisomer salts of unlike signs in 100 ml. of ethyl acetate, there were added 1000 ml. of methylene chloride, after several hours at room temperature, the crystals were filtered, washed and dried to obtain 94.7 gr. of pure salt.

EXAMPLE 28

D(−) alpha-phenylglycine

A solution of 177 gr. of ammonium D(−) alpha-azidophenylacetate in 1000 ml. of water in which 50 gr. of palladium/carbon 25% had been suspended, was hydrogenated at room temperature until no further hydrogen was absorbed, the reaction progress was controlled by fine layer chromatography until it showed the absence of alpha-azide. The catalyst was filtered out, followed by a water wash. Then the pH of the aqueous liquors was adjusted and the D(−) alpha-phenylglycine was filtered out to give 145 gr. with M.P.=259–60° (d.) and $[\alpha]_D^{20}$=−158° (in HCl solution).

EXAMPLE 29

D(—) alpha-phenylglycine

In the same conditions as the foregoing example, a solution of 177 gr. of D(—) alpha-azidophenylacetic acid in 1000 ml. of methanol was hydrogenated. It was filtered, washed with methanol and the solvent was evaporated at reduced pressure, to isolate 146 gr. of D(—) alpha-phenylglycine with M.P.=259–60° and a yield of 96% of the theoretical value.

All the melting points were determined in a Kofler microscope and are given uncorrected.

What I claim is:

1. A process for preparing an N-acylated derivative of 6-aminopenicillanic acid comprising the steps of (1) reacting 1 mole of a dimethylformiminium halosulfite N-halide of the formula

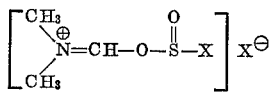

where X may be an atom of fluorine, chlorine or bromine with 1 mole of a carboxylic acid selected from the group consisting of α-azidophenylacetic acid, α-phenoxyacetic acid, α-carboxyphenylacetic acid, α-methoxyphenylacetic acid, α-fluorophenylacetic acid, α-bromophenylacetic acid, α-chlorophenylacetic acid, phenylacetic acid, α-methylphenylacetic acid, α-trifluoromethylphenylacetic acid, 2,6-dimethoxybenzoic acid and their inorganic or tertiary amine salts in suspension or solution in an anhydrous organic solvent at a temperature of about −30° to about 25° C. over a period of time from about 30 minutes to 2 hours; (2) gradually adding the reaction product from step (1) to 6-aminopenicillanic acid in an inert organic solvent with cooling in an ice bath in the presence of sufficient tertiary organic base or inorganic base to neutralize the liberated hydrogen halide; (3) isolating the N-acylated derivative of 6-aminopenicillanic acid.

2. A process according to claim 1 wherein the solvent in step (1) is selected from the group consisting of chloroform, dichloroethane, methylene chloride, benzene, toluene, xylene, dioxane, dimethylformamide, hexamethylphosphotriamide, tetrahydrofuran, acetonitrile, chlorobenzene and ethylene glycol dimethyl ether; the solvent in step (2) is selected from the group consisting of chloroform, methylene chloride and dichloroethane; and the tertiary organic base is triethylamine.

3. A process according to claim 1 wherein the carboxylic acid is 2,6-dimethoxybenzoic acid.

4. A process according to claim 1 wherein the carboxylic acid is α-phenoxyacetic acid.

5. A process according to claim 1 wherein the carboxylic acid is α-azidophenylacetic acid.

6. A process according to claim 1 wherein the carboxylic acid is D(—) α-methoxyphenylacetic acid.

7. A process according to claim 1 wherein the carboxylic acid is α-trifluoromethylphenylacetic acid.

8. A process according to claim 1 wherein the carboxylic acid is selected from the group consisting of α-chloro-, α-bromo-, and α-fluorophenylacetic acids and is prepared in situ by reacting 2 moles of the dimethylformiminium halosulfite N-halide with 1 mole of mandelic acid in step (1).

9. A process according to claim 8 wherein the carboxylic acid is α-chlorophenylacetic acid.

10. A process according to claim 8 wherein the carboxylic acid is α-bromophenylacetic acid.

11. A process according to claim 8 wherein the carboxylic acid is α-fluorophenylacetic acid.

References Cited

UNITED STATES PATENTS 3,479,338  11/1969  Adams _____ 260—239.1
3,520,876  7/1970  Alburn et al. _____ 260—239.1

NICHOLAS S. RIZZO, Primary Examiner

U.S. Cl. X.R.

424—271